United States Patent [19]

Lawson et al.

[11] Patent Number: 5,164,910

[45] Date of Patent: Nov. 17, 1992

[54] MOVING TARGET DISCRIMINATION FROM PASSIVE MEASUREMENTS

[75] Inventors: Larry A. Lawson, Winter Park; L. F. Culbreth, Maitland, both of Fla.

[73] Assignee: Martin Marietta Corporation, Bethesda, Md.

[21] Appl. No.: 547,214

[22] Filed: Jul. 3, 1990

[51] Int. Cl.⁵ .............................................. G06F 15/00
[52] U.S. Cl. .................................... 364/516; 364/423; 364/460; 235/411
[58] Field of Search ................ 342/450, 451, 458, 461; 235/400, 411, 412, 414, 415, 416; 364/423, 458, 460, 514, 516, 517

[56] References Cited

U.S. PATENT DOCUMENTS

| | | | |
|---|---|---|---|
| 1,232,968 | 7/1917 | Pollen et al. | 235/411 |
| 2,702,667 | 2/1955 | Ford et al. | 235/411 |
| 2,773,643 | 12/1956 | Teiling | 235/411 |
| 2,977,049 | 3/1961 | Miner et al. | 235/412 |
| 3,162,757 | 12/1964 | Zaklad | 364/460 |
| 3,304,409 | 2/1967 | Snowdon et al. | 235/414 |
| 3,594,556 | 7/1971 | Edwards | 364/458 |
| 3,798,420 | 3/1974 | Kaaz | 235/411 X |
| 3,863,257 | 1/1975 | Kang et al. | 364/458 X |
| 3,982,246 | 9/1976 | Lubar | 364/458 X |
| 4,034,208 | 7/1977 | Vaeth et al. | 235/411 |
| 4,179,697 | 12/1979 | Golinsky | 235/412 X |
| 4,320,287 | 4/1982 | Rawicz | 235/412 |
| 4,433,334 | 2/1984 | Caputi, Jr. | 342/450 |
| 4,438,438 | 3/1984 | Arens et al. | 342/451 |
| 4,558,323 | 12/1985 | Golinsky | 364/458 X |
| 4,613,867 | 9/1986 | Golinsky | 364/458 X |
| 4,670,757 | 6/1987 | Munich et al. | 364/451 X |
| 4,672,564 | 6/1987 | Egli et al. | 364/559 |
| 4,788,548 | 11/1988 | Hammerquist | 342/458 |
| 4,959,800 | 9/1990 | Woolley | 235/411 X |
| 4,988,189 | 1/1991 | Kroupa et al. | 364/458 X |

Primary Examiner—Thomas G. Black
Assistant Examiner—Thomas S. Auchterlonie
Attorney, Agent, or Firm—Burns, Doane, Swecker & Mathis

[57] ABSTRACT

A moving target discriminator uses only bearing information obtained from passive observations together with information about the movement of an observation platform to discriminate whether an object is moving. An underlying principle of the moving target discriminator is that the intercepts of successive line-of-sight observations taken from the moving platform will move only if the object is moving. In a specific embodiment, three line-of-sight observations are made, and an intercept is computed for two different pairs of observations. If the intercepts coincide, the cited object is classified as stationary otherwise, it is classified as moving. Measurement statistics are used to compensate the computed intercepts for navigational and observation errors.

2 Claims, 5 Drawing Sheets

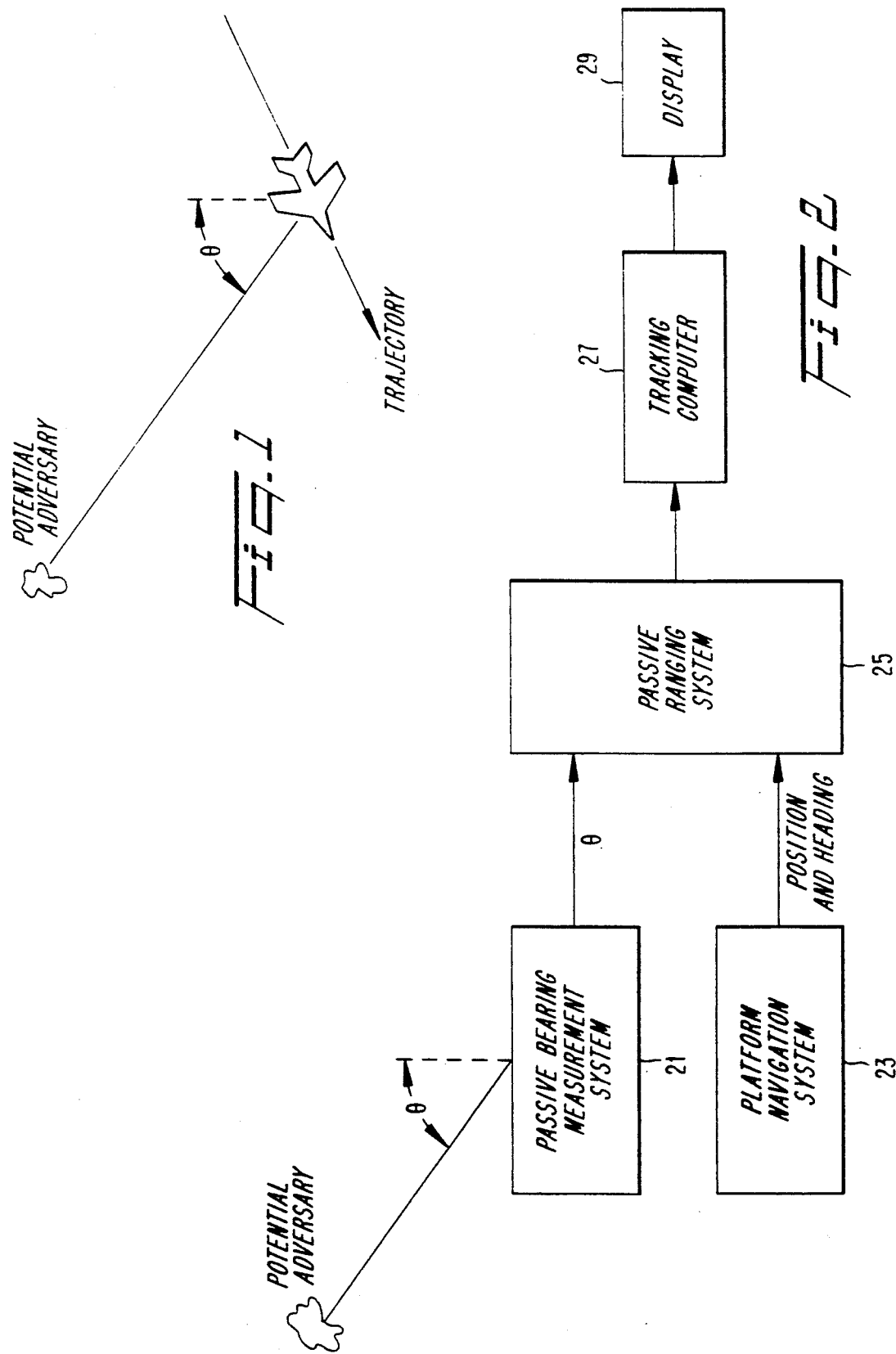

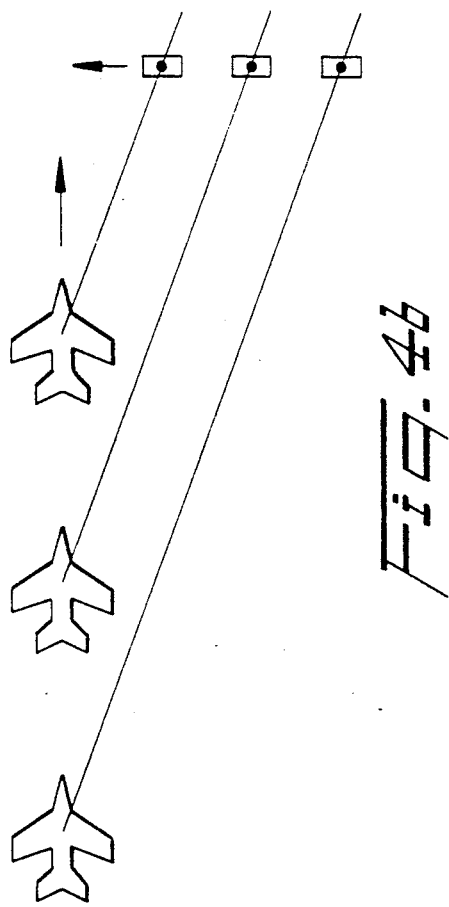
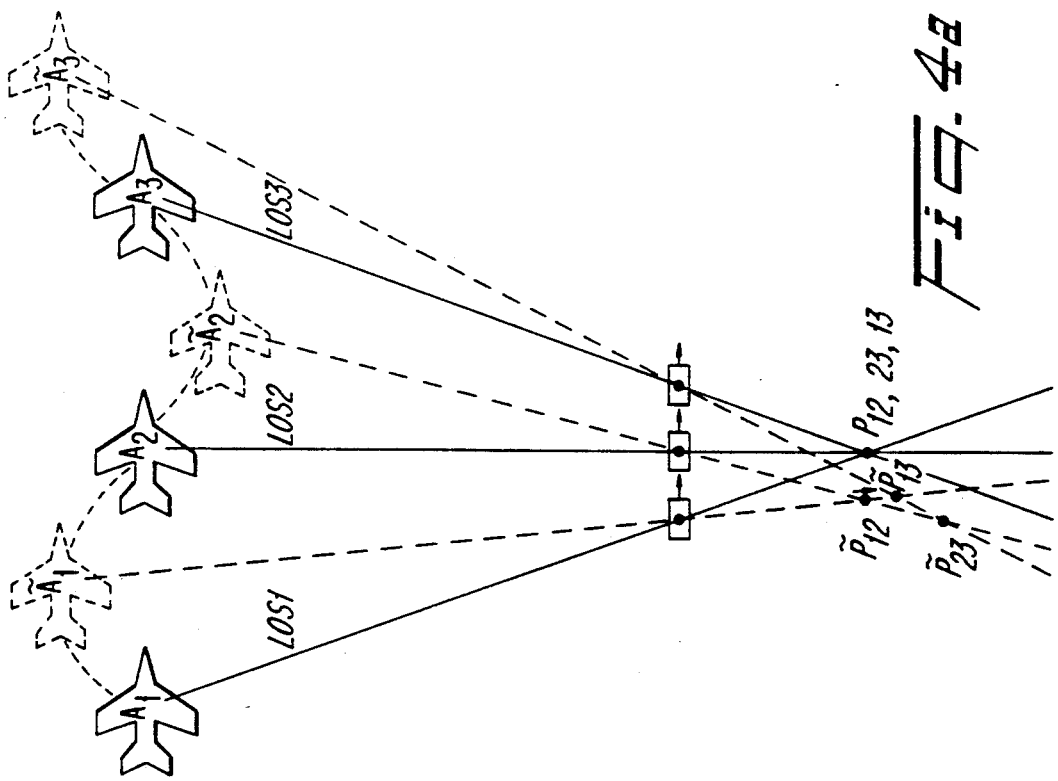
Fig. 4a
Fig. 4b

MOVING TARGET DISCRIMINATION FROM PASSIVE MEASUREMENTS

BACKGROUND OF THE INVENTION

The present invention relates to moving target discriminators and more particularly to a moving target discriminator using only passive measurements.

During tactical engagement, it is desirable for purposes of both threat evaluation and target identification to discriminate moving objects from stationary background objects, or clutter. In the past, such discrimination has been performed using radar, which provides range information about a potential adversary. A disadvantage of such an approach is that by emitting a radar beam, the presence of the party emitting the beam is necessarily betrayed. In tactical situations where the element of surprise is essential, the usual radar surveillance must be dispensed with in favor of somewhat more limited passive measurements. In order to maintain target identification capabilities, a discriminator is needed that uses only bearing data obtained from passive measurements without requiring range information as provided by conventional radar techniques. To distinguish the present invention from moving target identification (MTI) techniques heretofore associated with the use of radar, the term moving target discrimination (MTD) is employed.

SUMMARY OF THE INVENTION

According to a present invention, moving objects are discriminated by twice computing a distance basted on line-of-sight measurements, the two computations yielding identical results under ideal conditions for a stationary object; compensating the results for less-than-ideal conditions; and generating a discrimination indication based on a comparison of the compensated results.

More particularly, a moving target discriminator according to the present invention uses only bearing information obtained from passive observations together with information about the movement of an observation platform to discriminate whether an object is moving.

An underlying principle of the moving target discriminator is that the intercepts of successive line-of-sight observations taken from the moving platform will move only if the object is moving. In a specific embodiment, three line-of-sight observations are made, and an intercept is computed for two different pairs of observations. If the intercepts coincide, the sighted object is classified as stationary; otherwise, it is classified as moving. Measurement statistics are used to compensate the computed intercepts for navigational and observation errors.

BRIEF DESCRIPTION OF THE DRAWINGS

FIG. 1 is a diagram illustrating a tactical situation in which the present invention is used.

FIG. 2 is a block diagram of the present invention.

FIG. 3, including

FIG. 4, including FIGS. 4a through 4c, illustrates special cases of the general case of FIG. 1 according to which motion of a sighted object is tested.

DETAILED DESCRIPTION OF THE PREFERRED EMBODIMENT

Figure 3B:
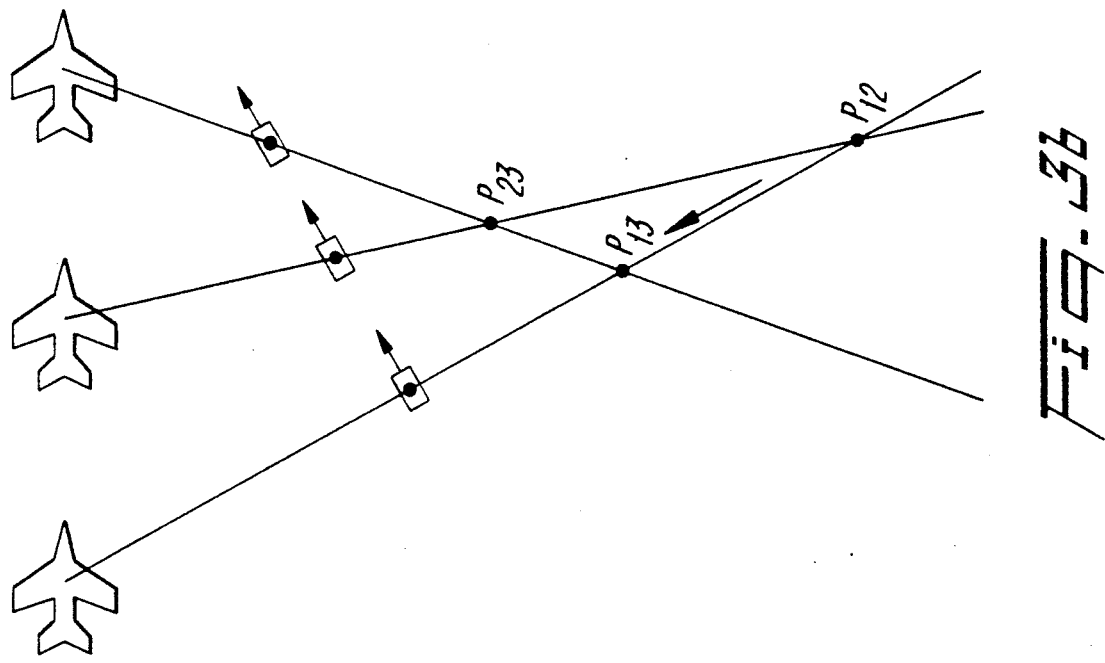
FIGS. 3a and 3b, is a diagram useful in elucidating the principle of the present invention.

Referring now to FIG. 1, an observation platform, depicted as an aircraft, is shown traveling along a trajectory assumed to be a straight line. As will be explained hereinafter, however, the invention can also be practiced with the observation platform executing a sinuous trajectory. A potential adversary to be categorized as moving or stationary lies at an unknown distance from the observation platform along an observation angle $\Theta$ with respect to a fixed reference. On board the observation platform are navigation and surveillance electronics used to determine the bearing angle $\Theta$ and to pinpoint the position of the observation platform at any given time. The navigation and surveillance electronics are illustrated in block diagram form in FIG. 2.

The navigation electronics comprises a platform navigation system 23 employing well-known circuitry and is commercially available. The platform navigation system 23 outputs the position and heading of the observation platform at regular intervals. The surveillance electronics include a passive bearing measurement system 21, a passive ranging system 25, and a tracking computer 27. The passive bearing measurement system 21 also employs well-known electrical circuitry and may be of a type that is commercially available.

The passive bearing measurement system 21 outputs the bearing angle $\Theta$ of a potential adversary at regular intervals. Using the bearing angle 8 of a potential adversary and the position of the observation platform, the moving target discrimination system 25 performs two partially independent calculations of the distance from the observation platform the intercept of multiple line of sight observations to the potential adversary and compares the results of the calculations to determine whether or not the potential adversary is a moving or a stationary object.

Besides discriminating between moving and stationary objects, the range information calculated by the moving target discriminator 25 may also be fed to a tracking computer 27 used to track and continually update the position of confirmed targets. The moving target discriminator 25 and the tracking computer 27 may both be realized by a single programmed digital computer. Programming the computer to perform as a tracking computer 27 is accomplished in a manner well-known in the art. Programming of the digital computer to perform the functions of the moving target discrimination system 25 may be accomplished in a manner that will become apparent to one of ordinary skill in the art in light of the following detailed description.

The results of the computations of both the moving target discriminator 25 and the tracking computer 27 may both be displayed on a standard computer display 29.

Figure 3A:
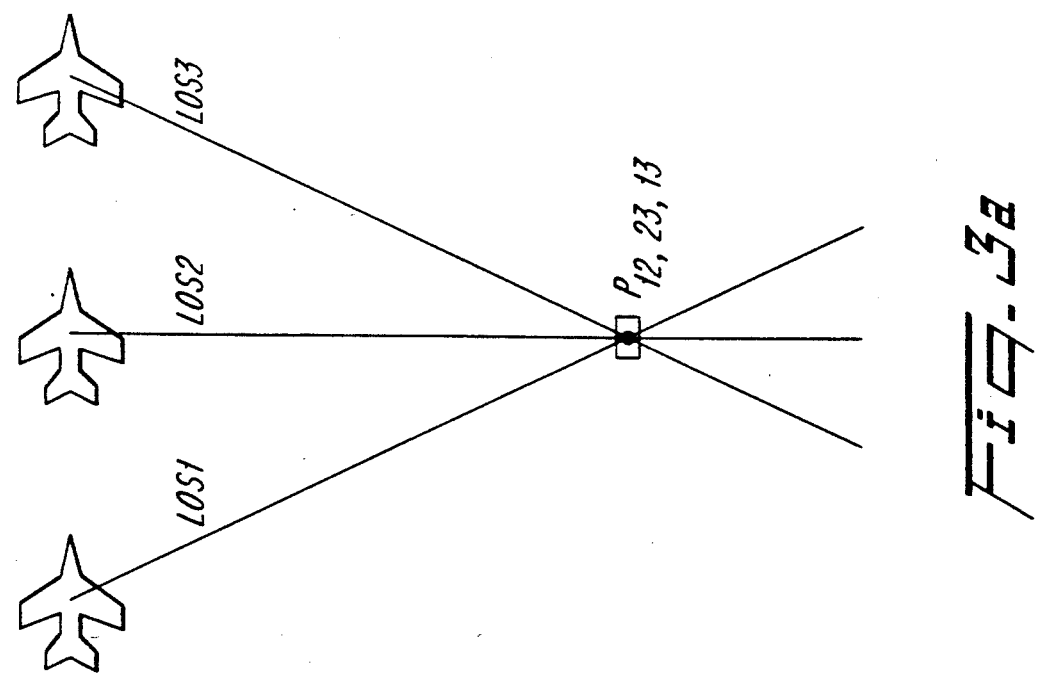

Referring to FIGS. 3a and 3b, the moving target discriminator of the present invention exploits the principle that, in the absence of special conditions to be discussed later, successive lines of sight (LOS) from a moving object towards a stationary object will intercept at a fixed point, whereas successive lines of sight from a moving object toward another moving object will intercept at different varying points. In both FIGS. 3a and 3b, an observation platform, for instance an aircraft, is assumed to be moving in the direction of the right hand corner of the page. Furthermore, a potential target is assumed to be stationary in FIG. 3a and moving toward the upper right hand corner of the page in FIG. 3b. In FIG. 3a, corresponding to the stationary object, the intercept $P_{12}$ of $LOS_1$ and $LOS_2$ coincides with the intercept $P_{13}$ of $LOS_1$ and $LOS_3$. In FIG. 3b, however, the intercepts $P_{12}$ and $P_{13}$ do not similarly coincide. Rather, the intercept $P_{13}$ is shifted relative to $P_{12}$ indicating that the sighted object is moving. This phenomenon may be used in conjunction with triangulation principles to discriminate moving objects from stationary objects using only passive measurements.

Figure 4C:
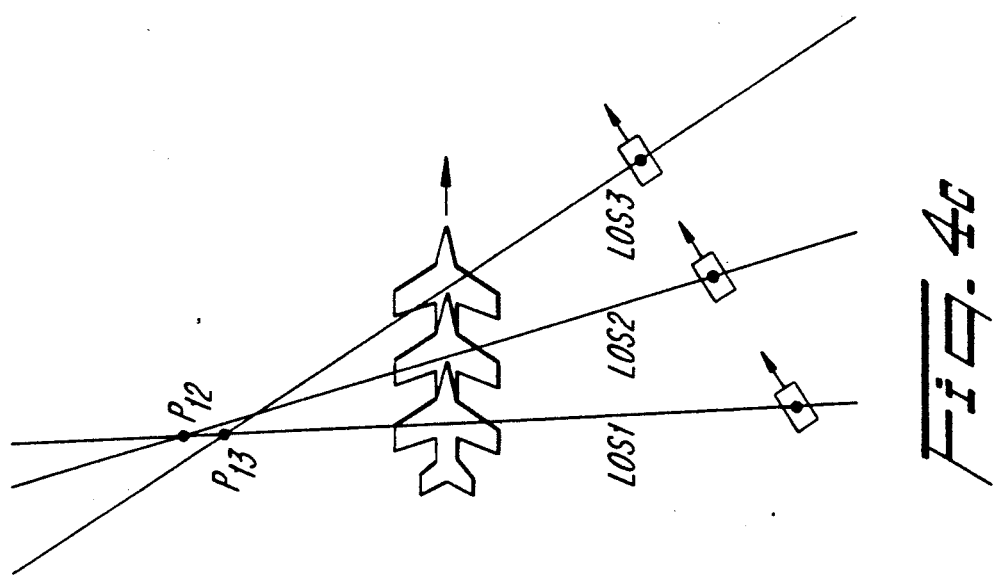

Referring to FIGS. 4a through 4c, three special cases of the general principle illustrated in FIG. 3 may be distinguished. In FIG. 4a, the observation platform and the potential target are assumed to be moving exactly parallel to one another in the same direction. In this instance, the intercepts of successive lines of sight $LOS_1$, $LOS_2$, $LOS_3$ exactly coincide as in the case of a stationary object. In practice, although the likelihood of exactly parallel movements is not great, the observing platform may avoid such an occurrence before the fact by executing maneuvers as indicated by dotted lines. Using $\bar{A}_1$, $\bar{A}_2$, $\bar{A}_3$, respectively, to represent successive positions of an aircraft along a maneuvering trajectory and $\bar{P}_{12}$, $\bar{P}_{23}$, $\bar{P}_{13}$ to represent intercepts of corresponding LOS to the target, it may be seen that $\bar{P}_{12}$, $\bar{P}_{23}$ and $\bar{P}_{13}$ do not coincide in the case of a maneuvering aircraft as do $P_{12}$, $P_{23}$ and $P_{13}$ in the case of a constant-bearing aircraft.

In FIG. 4b, the observation platform is assumed to be moving toward the right hand edge of the page and the potential target, or in this case the potential threat, is assumed to be moving toward the top of the page on a collision course with the observation platform. In this instance, depicted with geometric precision, the successive lines of sight $LOS_1$, $LOS_2$, $LOS_3$ are perfectly parallel and never intercept. In the real world with its imprecisions, however, the lines of sight will intercept although at a great distance. Therefore, when the intercept distance is calculated as being improbably large, a collision course by the moving object is indicated.

In FIG. 4c, the observation platform is assumed to be moving toward the right hand edge of the page and the potential target is assumed to be moving toward the upper right hand corner of the page with a greater velocity than that of the observation platform. In this instance, the successive lines of sight $LOS_2$, $LOS_2$, $LOS_3$ do intercept but on a side of the observation platform opposite the potential target. The closer the intercept is to the observation platform, the greater the velocity of the potential target. Such a condition therefore not only indicates that the object is moving but also gives a rough indication of the object's velocity.

Figure 5:
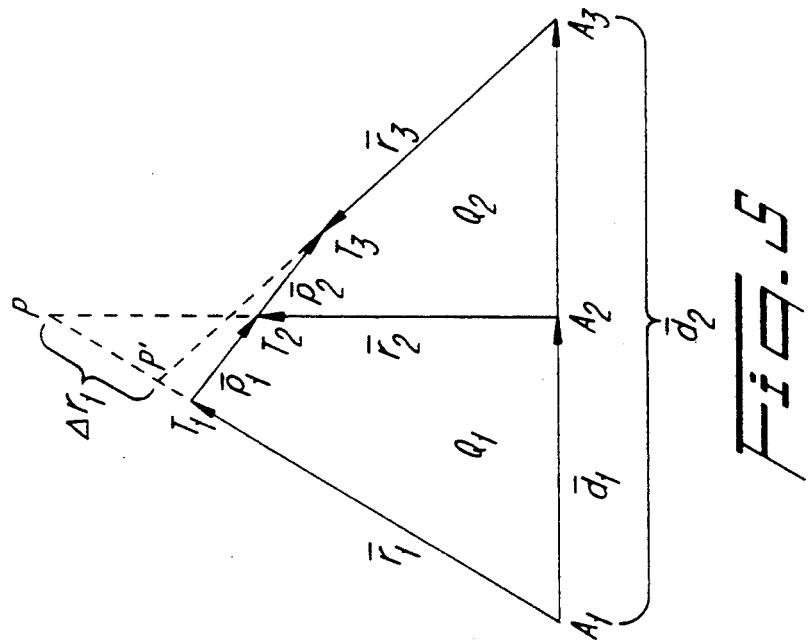
FIG. 5 is a diagram showing the geometry of the method of the present invention.

Referring now to FIG. 5, the underlying principle of the moving target discriminator involves the extension of triangulation principles to moving as well as stationary objects. $A_1$, $A_2$, $A_3$ represent successive positions of an observation platform such as an aircraft, for instance, and $T_1$, $T_2$, $T_3$ represents successive positions of a potential target. Range vectors $\bar{r}_1$, $\bar{r}_2$, $\bar{r}_3$ join the successive aircraft and target positions along lines of sight. Distance vectors $\bar{d}_1$ and $\bar{d}_2$ join successive positions of the aircraft and need not be of the same magnitude or direction although they are so illustrated for simplicity. Vectors $\bar{p}_1$ and $\bar{p}_2$ joining successive target positions also needn't be of the same direction or magnitude.

By vector addition, $$\bar{p} = \bar{d} - R\bar{x}, \quad (1)$$

with $$R = (\hat{r}_1, -\hat{r}_2) \quad (2)$$

and $$\bar{x} = \begin{pmatrix} r_1 \\ r_2 \end{pmatrix}. \quad (3)$$

In order to solve for the unknown $\bar{x}$, namely the range information absent from the passive measurements as opposed to active measurements, an additional constraint must be imposed. Choosing the least-squares solution with respect to $\rho^2$ of equation 1 yields the solution $$\bar{x} = (R^T R)^{-1} R^T \bar{d}. \quad (4)$$

Assuming that all four points of the quadrilateral lie in a plane and that measurements are perfect, minimizing $\rho^2$ results in the solution wherein $\rho_1 = \rho_2 = 0$ and $\bar{r}_1$ intercepts $\bar{r}_2$ at point P.

The same procedure may be repeated with respect to the second quadrilateral $Q_2$. Two partially independent calculations are thereby obtained of $r_2$. By computing $$\Delta r_2 = r_2(2) - r_2(1) \quad (5)$$

target motion may be detected according to the principle of FIG. 1, a non-zero difference indicating that the intercept P has shifted and that the target must therefore be moving.

Figure 6:
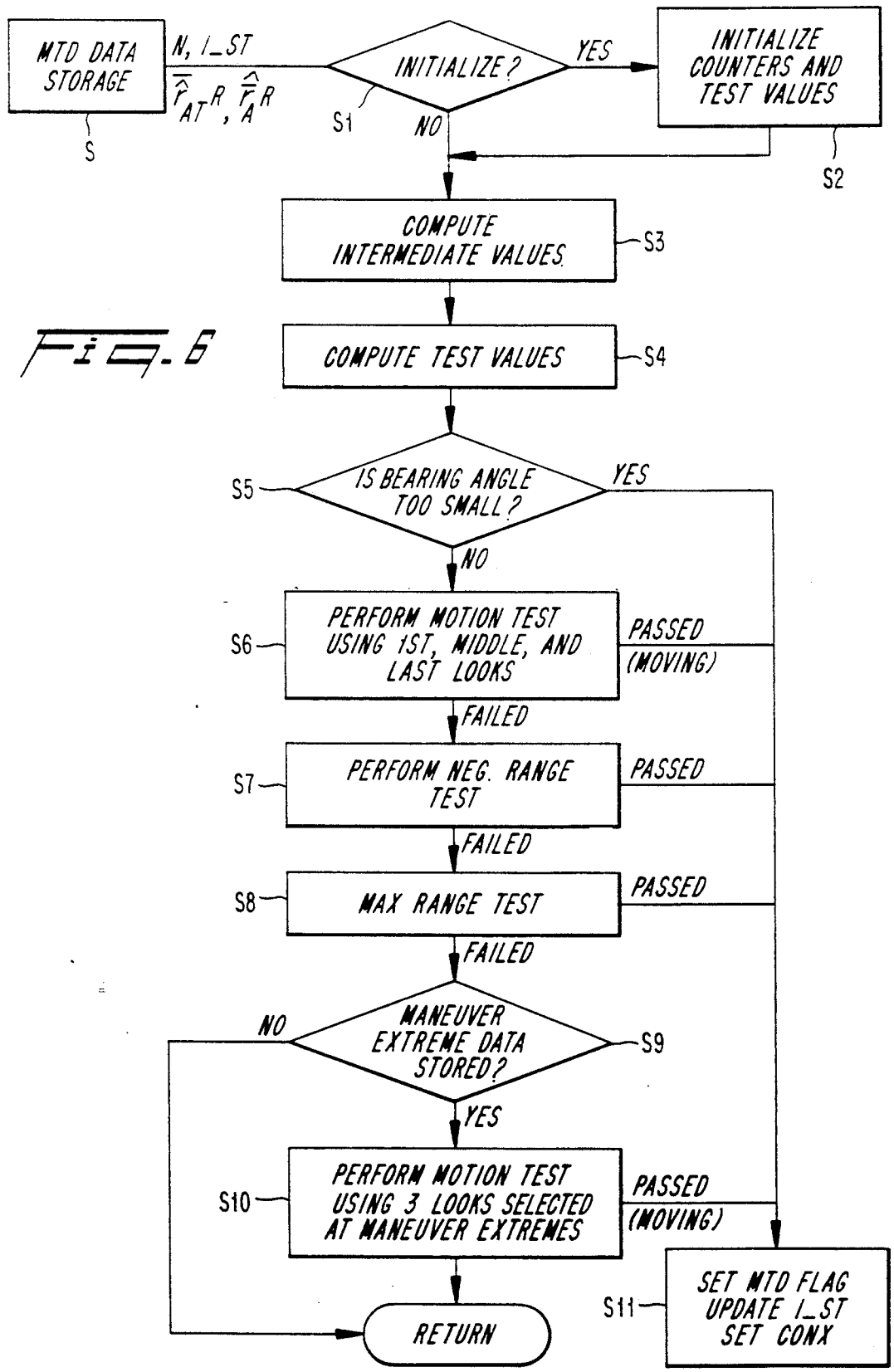
FIG. 6 is a flow chart of the target detection routine of the present invention.

Referring to FIG. 6, line of sight measurement data is continuously stored in MTD data storage S together with certain counters and test values which are initialized in step 1 of the moving target detection routine. Among those counters and test values are N, an index number of the object being observed, I_ST, a status flag identifying the object as being a persistent object and thus a potential target or as clutter, $\hat{r}_{AT}^R$, corresponding to $\hat{r}_1$ previously described, and $\hat{r}_A^R$ corresponding to $\bar{d}$ previously described.

Besides a first and a last line of sight measurement, a middle line of sight measurement is also employed in the moving target detection routine and is selected from among the measurements stored in MTD data storage S in steps 3 and 4. In step 5, it is determined whether the line of sight to the object substantially coincides with the direction of travel of the aircraft, in which case the reliability of the detection routine may be sufficiently impaired that the routine is interrupted rather than continued.

In steps 6, 7, 8 and 10, four different motion tests are applied in order of priority. In step 6, the regular motion test is applied using the first and last LOS measurements together with the middle LOS measurement previously selected in steps 3 and 4. If the test is "passed" indicating a moving object, the routine proceeds to step 11 and sets an MTD flag accordingly. Also in step 11, the object status I_ST is updated and a confidence value CONX is set indicating which of the motion tests was passed.

If instead the regular motion test fails, the detection routine then passes in turn to the negative range test described in connection with FIG. 4c and the maximum range test described in connection with FIG. 4b. The negative range test tests whether the intercepts of the lines-of-sight are on the opposite side of the observation platform from the target, indicating a target moving faster than the observation platform. The maximum range test tests whether the intercepts are improbably far away, indicating a target on a collision course with the observation platform. If either of these tests is passed, the routine proceeds to step 11 as before, setting the MTD flag, updating I_ST and setting CONX.

The final motion test performed in step 10 uses line of sight measurement data obtained during maneuvering of the aircraft as in FIG. 4a. Although data corresponding to a first, a middle and a last look could be successfully employed as in step 6, the motion detection routine instead selects data from three line of sight observations located at extreme positions of the maneuver trajectory. In FIG. 4a, the maneuver extremes are $A_1$, $A_2$, $A_3$ and are the observation points that result in maximum observability of object motion. Since the likelihood of exactly parallel motion of the observation platform and the sighted object is not great, the final test of step 10 is optional, and maneuver extreme data may not be present in MTD data storage S. Detection of this situation in step 9 completes the moving target detection routine.

Since in practice the calculations of $r$ will, due to measurement errors, always be non-zero, indicating a moving target, accounting for such measurement errors becomes necessary in order to discriminate true moving objects from apparent moving objects due to measurement noise. Using known statistics of measurement errors, the RMS error of $\Delta_r$, $\sigma_{\Delta r}$, may be computed, the ratio $|\Delta_r|/\sigma_{\Delta r}$ then giving a reliable indication of target motion. The procedure for computing $\sigma^2_{\Delta r}$ is derived below, being preceded by a mathematically detailed development of the underlying principle of the present invention.

Derivation of $\Delta r$

Referring back to FIG. 5 of the specification, an observing aircraft moves from $A_1$ to $A_2$ and a target moves from $T_1$ to $T_2$ during the time interval $$\Delta t = t_2 - t_1. \tag{6}$$

The aircraft makes directional measurements at $t_1$ and $t_2$. These measurements are of unit vectors $\hat{r}_1$ and $\hat{r}_2$, where $$\hat{r}_1 = \overline{r}_1/r_1 \tag{7}$$

and $$\hat{r}_2 = \overline{r}_2/r_2 \tag{8}$$

with $$r_1 = |\overline{r}_1| \tag{9}$$

and $$r_2 = |\overline{r}_2|. \tag{10}$$

From the figure, $\overline{r}_1$ and $\overline{r}_2$ are related to aircraft displacement ($\overline{d}_1$) and target displacement ($\overline{p}_1$) by $$\overline{p}_1 = \overline{d}_1 + \overline{r}_2 - \overline{r}_1 = \overline{d} - (\hat{r}_1, -\hat{r}_2)\begin{pmatrix} r_1 \\ r_2 \end{pmatrix} \tag{11}$$

The aircraft's navigator measures $\overline{d}_1$, so the unknown quantities in Eq. (11) are the ranges, $r_1$ and $r_2$, and the target's displacement $\overline{p}_1$. Equation (11) is rewritten as $$\overline{p}_1 = \overline{d}_1 - R\overline{x} \tag{12}$$

with $$R = (\hat{r}_1, -\hat{r}_2) \tag{13}$$

$$\text{and } \hat{\overline{x}} = \begin{pmatrix} r_1 \\ r_2 \end{pmatrix}. \tag{14}$$

The least-squares solution of Eq. (12), which minimizes $$\overline{p}_1^2 = \overline{p}_1 \cdot \overline{p}_1, \tag{15}$$

is $$\overline{x} = (R^T R)^{-1} R^T \overline{d}_1. \tag{16}$$

Here $$R^T R = \begin{pmatrix} \hat{r}_1 T \\ -\hat{r}_2 T \end{pmatrix}(\hat{r}_1, -\hat{r}_2) = \begin{pmatrix} 1 & -\hat{r}_1 \cdot \hat{r}_2 \\ -\hat{r}_1 \cdot \hat{r}_2, & 1 \end{pmatrix} \tag{17}$$

and $$(R^T R)^{-1} = \begin{pmatrix} 1, p \\ p, 1 \end{pmatrix}/\Delta, \tag{18}$$

with $$p = \hat{r}_1 \cdot \hat{r}_2 \tag{19}$$

$$\Delta = 1 - p^2. \tag{20}$$

Therefore, the least-squares solution of Eq. (12) is $$\overline{x} = \begin{pmatrix} r_1 \\ r_2 \end{pmatrix} = \begin{pmatrix} (s - pq)/\Delta \\ (ps - q)/\Delta \end{pmatrix} = \begin{pmatrix} (s - pq)/\Delta \\ pr_1 - q \end{pmatrix} \tag{21}$$

where $$s = \hat{r}_1 \cdot \overline{d}_1 \tag{22}$$

and $$q = \hat{r}_2 \cdot \overline{d}_1 \tag{23}$$

Because this solution minimizes $\overline{p}_1^2$, the $r_1$ and $r_2$ so obtained are distances, measured along $\hat{r}_1$ and $\hat{r}_2$, respectively, to the points which define the closest approach between the lines specified by point pairs $(A_1,T_1)$ and $(A_2,T_2)$. If all four of these points lie in a plane and if measurements are perfect, then the two measurements will indicate a target fixed at point P in FIG. 1.

In general, more than two passive measurements are required to detect target motion. An exception to this rule occurs when either $r_1$ or $r_2$ is not positive, in which case the target is obviously moving.

Let a third passive measurement ($\hat{r}_3$) be made at time $t_3$. Let $\bar{d}_1$ be displacement from $A_1$ to $A_2$, and $\bar{d}_2$ be displacement from $A_1$ to $A_3$. Let $$p_1 = \hat{r}_1 \cdot \hat{r}_2, \tag{24}$$

$$p_2 = \hat{r}_1 \cdot \hat{r}_3, \tag{25}$$

$$\Delta_1 = 1 - p_1^2, \tag{26}$$

$$\Delta_2 = 1 - p_2^2, \tag{27}$$

$$s_1 = \hat{r}_1 \cdot \bar{d}_1, \tag{28}$$

$$s_2 = \hat{r}_1 \cdot \bar{d}_2, \tag{29}$$

$$q_1 = \hat{r}_2 \cdot \bar{d}_1, \tag{30}$$

$$q_2 = \hat{r}_3 \cdot \bar{d}_2. \tag{31}$$

From these data two values of $r_1$ are computed: $r_1(1)$ is computed from measurements 1 and 2, and $r_1(2)$ is computed from measurements 1 and 3.

$$r_1(1) = (s_1 - p_1 q_1)/\Delta_1, \tag{32}$$

$$r_1(2) = (s_2 - p_2 q_2)/\Delta_2. \tag{33}$$

In general, if measurements are perfect and the target is moving, $r_1(2)$ will differ from $r_1(1)$. (An exception to this rule occurs when target velocity and aircraft velocity are parallel. This situation can be avoided by maneuvering of the aircraft.) So $$\Delta r_1 = r_1(2) - r_1(1) \tag{34}$$

may be used to detect target motion. But because measurements are never perfect, it is reasonable to base the criterion for declaring target motion on the ratio $|\Delta r_1|/\sigma_{\Delta r_1}$, where $\sigma_{\Delta r_1}$ is the RMS error in computing $\Delta r_1$, including known statistics of measurement errors.

Derivation of $\sigma_{\Delta r_1}^2$

Errors in computing $\Delta r_1$ include navigation errors (in measurements of $\bar{d}_1$ and $\bar{d}_2$) and observation errors (in measurements of $\hat{r}_1$, $\hat{r}_2$ and $\hat{r}_3$.

For navigation error ($\delta \bar{d}$) it is assumed that the error in measuring $\bar{d}$ is in a fixed, but random, direction during a given sequence of observations, this direction being specified by unit vector $\hat{u}_d$; and that the magnitude of $\delta \bar{d}$ varies linearly with time, starting at zero on the first look. Therefore, if the first look occurs at $t=t_1=0$ and the jth look at $t=t_j$, $$E\{\delta \bar{d}_j\} = t_j \sigma_d \hat{u}_d, \tag{35}$$

where $\sigma_d$ is the magnitude of error in computing aircraft velocity.

By a "random" direction is meant the following: if $\hat{u}$ is a unit vector in a random direction relative to a fixed unit vector $\hat{u}_o$, then $c\Theta = \hat{u}_o \cdot \hat{u}$ is uniformly distributed between $-1$ and $1$. So the density function for $c\Theta$ is $$p(c\Theta) = \begin{cases} \frac{1}{2}, & 0 \leq \Theta \leq \pi \\ 0, & \text{otherwise} \end{cases} \tag{36}$$

The density function for $\Theta$, $p(\Theta)$, is obtained as follows:

$$p(\Theta)d\Theta = p(c\Theta)|dc\Theta| = \tfrac{1}{2}s\Theta d\Theta$$

so $$p(\Theta) = \begin{cases} \tfrac{1}{2}s\Theta, & 0 \leq \Theta \leq \pi \\ 0, & \text{otherwise} \end{cases} \tag{37}$$

Therefore $$E\{c\Theta\} = E\{\hat{u}_0 \cdot \hat{u}\} = \tfrac{1}{2} \int_0^\pi c\Theta s\Theta d\Theta = \tfrac{1}{4} s^2\Theta \Big|_0^\pi = 0; \tag{38}$$

and $$E\{c^2\Theta\} = E\{(\hat{u}_0 \cdot \hat{u})^2\} = \tag{39}$$

$$\tfrac{1}{2} \int_0^\pi c^2 \Theta s\Theta d\Theta = -1/6 c^3\Theta \Big|_0^\pi = -1/6(-1-1) = \tfrac{1}{3}$$

Let $\hat{v}_o$ be another fixed unit vector such that $$\hat{v}_0 = a \hat{u}_o + b \hat{n} \tag{40}$$

where $\hat{n}$ is any (uniformly distributed) unit vector normal to $\hat{u}_o$ and $a^2 + b^2 = 1$. Then $$a = \hat{v}_0 \cdot \hat{u}_0, \tag{41}$$

$$b\hat{n} = (I - \hat{u}_0 \hat{u}_0^T) \hat{v}_0, \tag{42}$$

$$\hat{v}_0 \cdot \hat{u} = a \hat{u}_0 \cdot \hat{u} + b \hat{n} \cdot \hat{u}; \tag{43}$$

and $$E\{(\hat{u}_0 \cdot \hat{u})(\hat{v}_0 \cdot \hat{u})\} = a E\{(\hat{u}_0 \cdot \hat{u})^2\} + b E\{(\hat{u}_0 \cdot \hat{u})(\hat{n} \cdot \hat{u})\} = \frac{a}{3} = \tag{44}$$

$$\frac{\hat{u}_0 \cdot \hat{v}_0}{3}$$

For observation error ($\delta \hat{r}$) it is assumed that (a) errors in $\bar{d}$, $\hat{r}_1$, $\hat{r}_2$ and $\hat{r}_3$ are not cross-correlated and that (b) errors in $\hat{r}_1$, $\hat{r}_2$ and $\hat{r}_3$ are characterized by circular conical symmetry with angular variance $\sigma_\Theta^2$ so that $$E\{\sigma \hat{r} \delta \hat{r}^T\} = \tfrac{1}{2} \sigma_\Theta^2 (I - \hat{r}\hat{r}^T) \tag{45}$$

From Equations (24) through (34), $$\delta \Delta r_1 = \delta r_2(2) - \delta r_1(1) = \tag{46}$$

-continued
$$\frac{1}{\Delta_2^2}[\Delta_2(\delta s_2 - p_2\delta q_2 - q_2\delta p_2) - (s_2 - p_2q_2)\delta\Delta_2] -$$

$$\frac{1}{\Delta_1^2}[\Delta_1(\delta s_1 - p_1\delta q_1 - q_1\delta p_1) - (s_1 - p^1q^1)\delta\Delta_1] =$$

$$\frac{1}{\Delta_2}[\delta s_2 - p_2\delta q_2 - q_2\delta p_2 - r_1(2)\delta\Delta_2] -$$

$$\frac{1}{\Delta_1}[\delta s_1 - P_1\delta q_1 - q_1\delta p_1 - r_1(1)\delta\Delta_1]$$

with $$\delta p_1 = \hat{r}_1 \cdot \delta \hat{r}_2 + \hat{r}_2 \cdot \delta \hat{r}_1, \qquad (47)$$

$$\delta p_2 = \hat{r}_1 \cdot \delta \hat{r}_3 + \hat{r}_3 \cdot \delta \hat{r}_1, \qquad (48)$$

$$\delta\Delta_1 = -2p_1\delta p_1, \qquad (49)$$

$$\delta\Delta_2 = -2p_2\delta p_2, \qquad (50)$$

$$\delta s_1 = \hat{r}_1 \cdot \delta \overline{d}_1 + \overline{d}_1 \cdot \delta \hat{r}_1, \qquad (51)$$

$$\delta s_2 = \hat{r}_1 \cdot \delta d_2 + \overline{d}_2 \cdot \delta \hat{r}_1, \qquad (52)$$

$$\delta q_1 = \hat{r}_2 \cdot \delta d_1 + d_1 \cdot \delta \hat{r}_2, \qquad (53)$$

and $$\delta q_2 = \hat{r}_3 \cdot \delta \overline{d}_2 + d_2 \cdot \delta \hat{r}_3. \qquad (54)$$

Substitution of Eqs. (47) through (54), $$r_2 = p_1 r_1(1) - q_1, \qquad (55)$$

and $$r_3 = p_2 r_1(2) - q_2 \qquad (56)$$

into Eq. (46) gives $$\delta\Delta r_1 = \{1/\Delta_2(\hat{r}_1 - p_2\hat{r}_3)^T\}\delta\overline{d}_2 - \{1/\Delta_1(\hat{r}_1 - p_1\hat{r}_2)^T\}\delta\overline{d}_1 \\ + 1/\Delta_2\{[r_3 + p_2r_1(2)]\hat{r}_3 + \overline{d}_2\}^T - 1/\Delta_1\{[r_2 + p_1r_1(1)] \\ \hat{r}_2 + \overline{d}_1]^T\}\delta\hat{r}_1 + 1/\Delta_2\{[r_3 + p_2r_1(2)]\hat{r}_1 - p_2\overline{d}_2\}^T\delta\hat{r}_3 - 1/\Delta_1 \\ \{[r_2 + p_1r_1(1)]\hat{r}_1 - p_1\overline{d}_1\}^T\delta\hat{r}_2 \qquad (57)$$

The quantity to be computed is $$\sigma^2_{\Delta r_1} = E\{(\delta\Delta r_1)^2\}. \qquad (58)$$

The contribution to this quantity of the effects of navigation error is computed as follows. Let $$\overline{E}_1 = 1/\Delta_1(\hat{r}_1 - p_1\hat{r}_2) \qquad (59)$$

and $$\overline{E}_2 = 2/\Delta_2(\hat{r}_1 - p_2\hat{r}_3) \qquad (60)$$

Then $$E\{|\overline{E}_2 \cdot \delta \overline{d}_2 - \overline{E}_1 \cdot \delta \overline{d}_1|^2\} = \sigma_d^{-2} E\{|t_3\overline{E}_2 \cdot \hat{u}_d - t_2\overline{E}_1 \cdot \hat{u}_d|^2\} \qquad (61)$$

-continued
$$\sigma_d^{-2}\{\underbrace{t_3^2 E(\overline{E}_2 \cdot \hat{u}_d)^2}_{|\overline{E}_2|^{2/3}} - 2t_2t_3 E\{\underbrace{(\overline{E}_2 \cdot \hat{u}_d)(\overline{E}_1 \cdot \hat{u}_d)}_{\overline{E}_1 \cdot \overline{E}_2/3}\} + t_2^2 E(\underbrace{\overline{E}_1 \cdot \hat{u}_d)^2}_{|\overline{E}_1|^{2/3}}\}$$

follows from Eqs. (35), (39) and (44). Therefore, if $\overline{\epsilon}_1$ and $\overline{\epsilon}_2$ are defined by $$\overline{\epsilon}_1 = \frac{\sigma_d t_2}{\sqrt{3}} \overline{E}_1 = \frac{\sigma_d t_2}{\Delta_1 \sqrt{3}} (\hat{r}_1 - p_1\hat{r}_2) \qquad (62)$$

and $$\overline{\epsilon}_2 = \frac{\sigma_d t_3}{\sqrt{3}} \overline{E}_2 = \frac{\sigma_d t_3}{\Delta_2 \sqrt{3}} (\hat{r}_1 - p_2\hat{r}_3) \qquad (63)$$

the contribution of navigation error to $\sigma^2_{\Delta r_1}$ is $$E\{|\overline{E}_2 \cdot \delta\overline{d}_2 - E_1\delta\overline{d}_1|^2\} = |\overline{\epsilon}_2 - \overline{\epsilon}_1|^2 \qquad (64)$$

To compute the contribution of the effect of $\delta r_1$, let $$\overline{F}_1 = 1/\Delta_1\{[r_2 + p_1r_1(1)]\hat{r}_2 + \overline{d}_1\} \qquad (65)$$

and $$\overline{F}_2 = 1/\Delta_2\{[r_3 + p_2r_1(2)]\hat{r}_3 + \overline{d}_2\} \qquad (66)$$

Then $$E\{(\overline{F}_2 - \overline{F}_1)^T \delta\hat{r}_1 \delta\hat{r}_1^T (\overline{F}_2 - \overline{F}_1)\} = \qquad (67)$$

$$\frac{\sigma_\Theta^2}{2} (\overline{F}_2 - \overline{F}_1)^T (I - \hat{r}_1\hat{r}_1^T)(\overline{F}_2 - \overline{F}_1)$$

follows from Eq. (45). Note that $$(I - \hat{r}_1\hat{r}_1^T)^2 = (I - \hat{r}_1\hat{r}_1^T) \qquad (68)$$

and define $$F_1 = \frac{\sigma_\Theta}{\sqrt{2}} (I - \hat{r}_1\hat{r}_1^T)\overline{F}_1 \qquad (69)$$

and $$\overline{F}_2 = \frac{\sigma_\Theta}{\sqrt{2}} (I - \hat{r}_1\hat{r}_1^T)\overline{F}_2 \qquad (70)$$

Then the contribution to $\sigma^2_{\Delta r_1}$ of the effect of $\delta\hat{r}_1$ is $$E\{\overline{F}_2 - \overline{F}_1)^T\delta\hat{r}_1\delta\hat{r}_1^T(\overline{F}_2 - \overline{F}_1)\} = |\overline{F}_2 - \overline{F}_1|^2 \qquad (71)$$

To compute the contributions of $\delta\hat{r}_2$ and $\delta\hat{r}_3$, let $$\overline{G}_1 = 1/\Delta_1\{[r_2 + p_1r_1(1)]\hat{r}_1 - p_1\overline{d}_1\} \qquad (72)$$

and $$\overline{G}_2 = 1/\Delta_2\{[r_3 + p_2r_1(2)]\hat{r}_1 - p_2\overline{d}_2\} \qquad (73)$$

Then $$E((\overline{G}_2^T\delta\hat{r}_3 - \overline{G}_1^T\delta\hat{r}_2)(\delta\hat{r}_3^T\overline{G}_2 - \delta\hat{r}_2^T\overline{G}_1)) \\ = E\{\overline{G}_2^T\delta\hat{r}_3\delta\hat{r}_3^T\overline{G}_2)\} + E\{\overline{G}_1^T\delta\hat{r}_2\delta\hat{r}_2^T\overline{G}_1) \qquad (74)$$

because $\delta\hat{r}_2$ and $\delta\hat{r}_3$ are uncorrelated. Define $$\overline{G}_1 = \frac{\sigma_\Theta}{\sqrt{2}} (I - \hat{r}_2\hat{r}_2^T)\overline{G}_1 \qquad (75)$$

-continued and $$\overline{G}_2 = \frac{\sigma_\theta}{\sqrt{2}} (I - \hat{r}_3 \hat{r}_3^T) \overline{G}_2 \qquad (76)$$

so that $$E\{(\overline{G}_2^T \delta \hat{r}_3 - \overline{G}_1^T \delta \hat{r}_2)(\delta \hat{r}_3 \overline{G}_2 - \delta \hat{r}_2 \overline{G}_1)\} |\overline{G}_1|^2 + |\overline{G}_2|^2 \qquad (77)$$

and finally $$\sigma_{\Delta r1}^2 = |\overline{\epsilon}_2 - \overline{\epsilon}_1|^2 + |\overline{F}_2 - \overline{F}_1|^2 + |\overline{G}_1|^2 + |\overline{G}_2|^2. \qquad (78)$$

By extending triangulation principles to apply to moving objects in conjunction with the application of the statistics of measurement errors, moving targets may be reliably discriminated using solely passive measurement, allowing the presence of the observer to remain undisclosed.

Numerous real-world applications of the moving target discrimination system of the present invention will be apparent to those of ordinary skill in the art. For example, the locations of multiple moving targets may be displayed to an aircraft pilot together with indications of the range and speed of the respective targets (determined using auxiliary sensors if necessary) to allow the pilot to decide how best to engage the multiple targets. Alternatively, the moving target data may be used to guide a missile directly. Also, the moving target data may be sent to a second computer where it may be combined with data from other sensors to form a "fused" data set according to which tactical decisions may be made.

In a further example, the moving target data may be used to control, or "cue", the passive measurement sensor or other sensors in order to perform further measurements. For instance, the passive measurement sensor may be controlled to scan a restricted area at a lower rate with increased sensitivity or to scan a larger area with less sensitivity. Active sensors may also be directed to the location of a detected moving target in order to pinpoint the target while maintaining low observability. The moving target data may also be used to cause a suspect region to be imaged on a display for scrutiny by the pilot.

Numerous other applications will be found to advantageously employ the method and apparatus of the present invention, the foregoing examples being illustrative only.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A moving target discrimination method for detecting motion of a potential target from an aircraft, comprising the steps of:
    obtaining three line-of-sight vectors from a first look and two successive looks of an optical sensor from said aircraft to said potential target as said aircraft is moving at constant velocity;
    pairing said line-of-sight vectors to obtain two unique line-of-sight vector pairs;
    determining for each line-of-sight vector pair a distance from a position of said aircraft at a time of said first look to an intercept of line-of-sight vectors of said line-of-sight vector pair if said line-of-sight vectors do intercept, else a distance from a position of said aircraft at a time of said first look to a point of minimum distance between said line-of-sight vectors of said line-of-sight vector pair if said line-of-sight vectors do not intercept;
    determining magnitude of a difference between said distance for one of said line-of-sight vector pairs and said distance for another of said line-of-sight vector pairs; and
    indicating motion of said potential target if said magnitude is greater than a magnitude that could be induced by system error.

2. A moving target discrimination method for detecting motion of a potential target from an aircraft, comprising the steps of:
    means for obtaining three line-of-sight vectors from a first look and two successive looks of an optical sensor from said aircraft to said potential target as said aircraft is moving at constant velocity;
    means for pairing said line-of-sight vectors to obtain two unique line of sight vector pairs;
    means for determining for each line-of-sight vector pair a distance from a position of said aircraft at time of said first look to an intercept of said line-of-sight vectors of said line-of-sight vector pair if said line-of-sight vector vectors do not intercept, else a distance from a position of said aircraft at a time of said first look to a point of minimum distance between said line-of-sight vectors of said line-of-sight vector pair if said line-of-sight do not intercept;
    means for determining magnitude of a difference between said distance for one of said line-of-sight vector pairs and said distance for another of said line-of-sight vector pairs; and
    means for indicating motion of said potential target if said magnitude is greater than a magnitude that could be induced by system error.

* * * * *

UNITED STATES PATENT AND TRADEMARK OFFICE
CERTIFICATE OF CORRECTION

PATENT NO. : 5,164,910

DATED : November 17, 1992

INVENTOR(S) : Larry A. LAWSON et al.

It is certified that error appears in the above-identified patent and that said Letters Patent is hereby corrected as shown below:

Col. 2, line 32: "8" should read --$\theta$--.
Col. 3, line 48: "$LOS_2$" (first occurrence) should read --$LOS_1$--.
Col. 4, line 45: "$\vec{1}_{AT}{}^R$" should read --$\vec{\hat{1}}_{AT}{}^R$--.
Col. 4, line 46: "$\hat{r}_1$" should read --$\bar{r}_1$--.
Col. 4, line 47: "dpreviously" should read --$\bar{d}$ previously--.
Col. 6, line 19:

"and $$\frac{\hat{}}{x} = \begin{pmatrix} r_1 \\ r_2 \end{pmatrix}. \qquad (14)$$"

should read:

--and $$\bar{x} = \begin{pmatrix} r_1 \\ r_2 \end{pmatrix}. \qquad (14)$$--.

Col. 6, line 34:

"$$R^TR = \begin{pmatrix} \hat{1}_1 T \\ -\hat{1}_2 T \end{pmatrix}(\hat{1}_1, -\hat{1}_2) = \begin{pmatrix} 1 & -\hat{1}_1 \cdot \hat{1}_2 \\ -\hat{1}_1 \cdot \hat{1}_2, & 1 \end{pmatrix} \qquad (17)$$"

should read:

--$$R^TR = \begin{pmatrix} \hat{1}_1^T \\ -\hat{1}_2^T \end{pmatrix}(\hat{1}_1, -\hat{1}_2) = \begin{pmatrix} 1 & -\hat{1}_1 \cdot \hat{1}_2 \\ -\hat{1}_1 \cdot \hat{1}_2, & 1 \end{pmatrix} \qquad (17)$$--.

Col. 7, line 61: "$\bar{d}is$" should read: --$\bar{d}$ is--.

UNITED STATES PATENT AND TRADEMARK OFFICE
CERTIFICATE OF CORRECTION

PATENT NO. : 5,164,910

DATED : November 17, 1992

INVENTOR(S) : Larry A. LAWSON et al.

It is certified that error appears in the above-identified patent and that said Letters Patent is hereby corrected as shown below:

Col. 7, line 64: "$\delta\bar{d}$varies" should read: --$\delta\bar{d}$ varies--.
Col. 7, line 67: "$E\{\delta d_j\} = t_j\sigma_{\bar{d}}\hat{u}_{\bar{d}}$" should read: --$E\{\delta\bar{d}_j\} = t_j\sigma_{\bar{d}}\hat{u}_{\bar{d}}$--.
Col. 8, line 2: "$\sigma_d$" should read: --$\sigma_{\bar{d}}$--.
Col. 8, line 4: "$\hat{u}$is" should read: --$\hat{u}$ is--.
Col. 8, line 6: "$c\Theta = \hat{u}_o \cdot \hat{u}$is" should read: --$c\Theta = \hat{u}_o \cdot \hat{u}$ is--.
Col. 9, line 30: "$\delta s_2 = \hat{r}_1 \cdot \delta d_2 + \bar{d}_2 \cdot \delta\hat{r}_1,$ (52)"
should read: --$\delta s_2 = \hat{r}_1 \cdot \delta\bar{d}_2 + \bar{d}_2 \cdot \delta\hat{r}_1,$ (52)--.
Col. 9, line 32: "$\delta q_1 = \hat{r}_2 \cdot \delta d_1 + d_1 \cdot \delta\bar{r}_2,$ (53)"
should read: --$\delta q_1 = \hat{r}_2 \cdot \delta\bar{d}_1 + \bar{d}_1 \cdot \delta\hat{r}_2,$ (53)--.
Col. 9, line 62: "$\bar{E}_2 = 2/\Delta_2(\hat{r}_1 - p_2\hat{r}_3)$ (60)"
should read: --$\bar{E}_2 = 1/\Delta_2(\hat{r}_1 - p_2\hat{r}_3)$ (60)--.
Col. 10, line 25:

"$\bar{F}_2 = 1/\Delta_2)[r_3 + p_2 r_1(2)]\hat{r}_3 + \bar{d}_2\}$   (66)"

should read:

--$\bar{F}_2 = 1/\Delta_2\{[r_3 + p_2 r_1(2)]\hat{r}_3 + \bar{d}_2\}$   (66)--.

Col. 10, line 40:

"$F_1 = \frac{\sigma\Theta}{\sqrt{2}}(I - \hat{r}_1\hat{r}_1^T)\bar{F}_1$   (69)"

should read:

UNITED STATES PATENT AND TRADEMARK OFFICE
CERTIFICATE OF CORRECTION

PATENT NO. : 5,164,910          Page 3 of 5
DATED     : November 17, 1992
INVENTOR(S) : Larry A. LAWSON et al.

It is certified that error appears in the above-identified patent and that said Letters Patent is hereby corrected as shown below:

$$--F_1 = \frac{\sigma\theta}{\sqrt{2}}(I-\hat{r}_1\hat{r}_1^T)\overline{F}_1 \qquad (69) --.$$

Col. 10, line 45:

$$"\overline{F}_2 = \frac{\sigma\theta}{\sqrt{2}}(I-\hat{r}_1\hat{r}_1^T)\overline{F}_2 \qquad (70)"$$

should read:

$$--\overline{F}_2 = \frac{\sigma\theta}{\sqrt{2}}(I-\hat{r}_1\hat{r}_1^T)\overline{F}_2 \qquad (70) --.$$

Col. 10, lines 61-62:

$$"E((\overline{G}_2^T\delta\hat{r}_3-\overline{G}_1^T\delta\hat{r}_2)(\delta\hat{r}_3^T\overline{G}_2-\delta\hat{r}_2^T\overline{G}_1)) = E(\overline{G}_2^T\delta\hat{r}_3\delta\hat{r}_3^T\overline{G}_2)) + E(\overline{G}_1^T\delta\hat{r}_2\delta\hat{r}_2^T\overline{G}_1)"$$

should read:

$$--E\{(\overline{G}_2^T\delta\hat{r}_3-\hat{G}_1^T\delta\hat{r}_2)(\delta\hat{r}_3^T\overline{G}_2-\delta\hat{r}_2^T\overline{G}_1)\} = E\{\overline{G}_2^T\delta\hat{r}_3\delta\hat{r}_3^T\overline{G}_2\} + E\{\overline{G}_1^T\delta\hat{r}_2\delta\hat{r}_2^T\overline{G}_1\}--$$

Col. 10, line 67:

$$"\overline{G}_1 = \frac{\sigma\theta}{\sqrt{2}}(I-\hat{r}_2\hat{r}_2^T)\overline{G}_1 \qquad (75)"$$

should read:

UNITED STATES PATENT AND TRADEMARK OFFICE
CERTIFICATE OF CORRECTION

PATENT NO. : 5,164,910

DATED : November 17, 1992

INVENTOR(S) : Larry A. LAWSON et al.

It is certified that error appears in the above-identified patent and that said Letters Patent is hereby corrected as shown below:

$$--\overline{G}_1 = \frac{\sigma\theta}{\sqrt{2}}(I-\hat{r}_2\hat{r}_2^T)\overline{G}_1 \qquad (75)--.$$

Col. 11, line 5:

$$"\overline{G}_2 = \frac{\sigma\theta}{\sqrt{2}}(I-\hat{r}_3\hat{r}_3^T)\overline{G}_2 \qquad (76)"$$

should read:

$$--\overline{G}_2 = \frac{\sigma\theta}{\sqrt{2}}(I-\hat{r}_3\hat{r}_3^T)\overline{G}_2 \qquad (76)--.$$

Col. 11, line 10:

$$"E\{(\overline{G}_2^T\delta\hat{r}_3-\overline{G}_1^T\delta\hat{r}_2)(\delta\hat{r}_3\overline{G}_2-\delta\hat{r}_2\overline{G}_1)\}|\overline{G}_1|^2 + |\overline{G}_2|^2 \qquad (77)"$$

should read:

$$--E\{(\overline{G}_2^T\delta\hat{r}_3-\overline{G}_1^T\delta\hat{r}_2)(\delta\hat{r}_3\overline{G}_2-\delta\hat{r}_2\overline{G}_1)\} = |\overline{G}_1|^2 + |\overline{G}_2|^2 \qquad (77)--.$$

Col. 11, line 15:

$$"\sigma\Delta r1^2 = |\overline{\epsilon}_2-\overline{\epsilon}_1|^2 + |\overline{F}_2-\overline{F}_1|^2 + |\overline{G}_1|^2 + |\overline{G}_2|^2. \qquad (78)"$$

should read:

UNITED STATES PATENT AND TRADEMARK OFFICE
CERTIFICATE OF CORRECTION

PATENT NO. : 5,164,910
DATED : November 17, 1992
INVENTOR(S) : Larry A. LAWSON et al.

It is certified that error appears in the above-identified patent and that said Letters Patent is hereby corrected as shown below:

$$--\sigma^2_{\Delta r1} = \lceil\overline{\epsilon}_2 - \overline{\epsilon}_1\rceil^2 + |\overline{F}_2 - \overline{F}_1|^2 + |\overline{G}_1|^2 + |\overline{G}_2|^2. \quad (78)--.$$

Claim 2, line 1: "method" should read --system--;
          line 3: delete "the steps of";
          line 12: before "time" insert --a--;
          line 14: delete "vector" and delete "not".

Signed and Sealed this

Seventh Day of December, 1993

BRUCE LEHMAN

*Attest:*

*Attesting Officer*     *Commissioner of Patents and Trademarks*